Nov. 12, 1957 A. H. REDDING ET AL 2,812,715
FUEL SYSTEM
Filed June 23, 1954 2 Sheets-Sheet 2

INVENTORS.
ARNOLD H. REDDING
DONALD F. WINTERS
BY Ralph T. French
ATTORNEY

United States Patent Office 2,812,715
Patented Nov. 12, 1957

2,812,715

FUEL SYSTEM

Arnold H. Redding, Wallingford, and Donald F. Winters, Folsom, Pa., assignors to Westinghouse Electric Corporation, East Pittsburgh, Pa., a corporation of Pennsylvania Application June 23, 1954, Serial No. 438,826

6 Claims. (Cl. 103—5)

This invention relates to an improvement in a system for supplying fuel under pressure to an aicrcraft engine and has for an object to provide a fuel system of the above type in which the temperature rise of the fuel passed therethrough is considerably reduced.

In a present fuel system for an aircraft engine, a booster pump is provided in addition to the tank pump to insure that sufficient head pressure is imparted to the fuel at the inlet of the main fuel pump. Maintenance of adequate head pressure at the inlet to the main pumps is essential to avoid the phenomenon generally known as "cavitation" with attendant fuel vaporization. The booster pump, although only needed to maintain head pressure in the event of failure of the tank pump, is operated continuously and imparts considerable heat to the fuel before delivery to the main pumps. At high altitudes the temperature rise of the fuel through the system becomes very critical, since the engine requires considerably less fuel than at sea level design conditions and further heat is added by the main pumps as the excess fuel pumped by the main pumps is recirculated until demanded to the engine. Because of low fuel demand by the engine at high altitudes, insufficient cool fuel from the tanks is drawn into the system to absorb the heat load of the pumping system. Approximately 40% of the pumping heat load is contributed by the constantly operating booster pump. Hence, it is another object to provide an improved fuel system in which the booster pump is obviated, so that its heat load may be eliminated.

In the present fuel system mentioned above, the main pumps are designed to pump more fuel than required by the engine under all conditions. For example, one of the design requirements is that the main pumps must deliver approximately 210% of the engine fuel requirements at sea level take off and sea level flight at 1.15 ram pressure ratio. In view of the above, it is a further object to provide a fuel system in which a portion of the excess fuel delivery of the main pumps may be utilized, in the event of tank pump failure, to maintain adequate head pressure at the fuel inlet to the main pumps.

A more specific object is to provide, in a fuel system having a main pump and means for recirculating fuel pumped in excess of engine requirements, a jet pump for maintaining adequate head pressure at the inlet to said main pump and means responsive to reduction in head pressure upstream of the main pumps for diverting at least a portion of the excess fuel through said jet pump.

The above and other objects are effected by the invention as will be apparent from the following description taken in connection with the accompanying drawings, forming a part of this application, in which.

Figure 1:
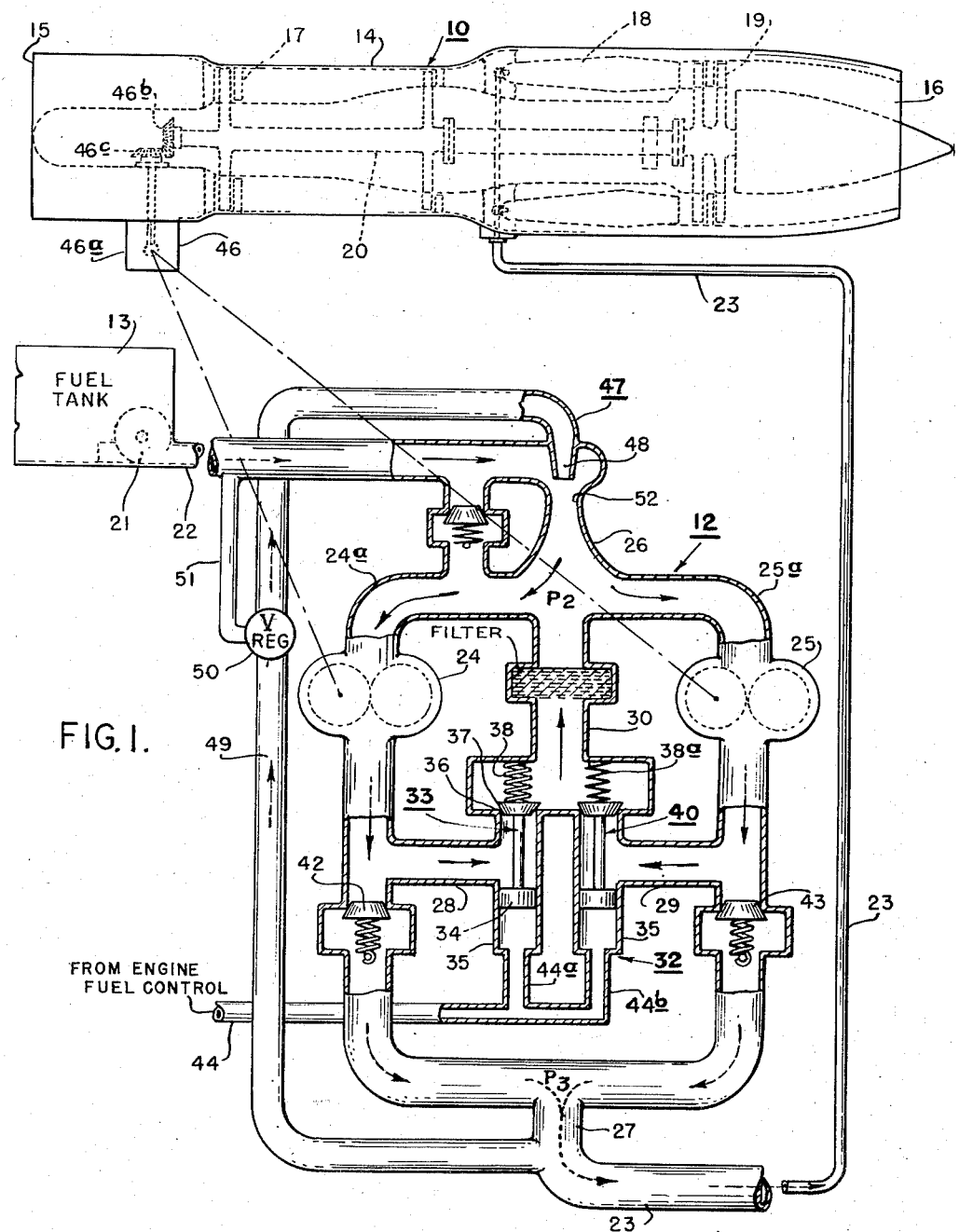
Fig. 1 is a diagrammatic view of a fuel pumping system constructed in accordance with the invention.

Referring to the drawings in detail, Fig. 1 shows an aircraft engine 10, a fuel system generally designated 12 for pumping fuel thereto and a tank 13 for containing a fuel supply. The aircraft engine 10 may be of any known form commonly used to propel aircraft and is herein shown as being a turbojet engine. The usual elements of a turbojet engine are a tubular shell or casing 14 having an air inlet 15 and an exhaust nozzle 16. Within the shell 14 a compressor 17, fuel combustion apparatus 18 and a turbine 19 are arranged as illustrated, so that, in operation, as air is drawn through the inlet 15 and compressed by the compressor 17, it is directed to the combustion apparatus wherein it is combined with fuel fed thereto from the tank 13 and ignited, forming hot motive gases which drive the turbine 19 and then issue in a jet through the exhaust nozzle 16 to provide a propulsive thrust. The turbine 19 and the compressor 17 are connected to each other by means of a shaft 20 disposed in an axial position in the casing 14, so that as the turbine 19 is driven by the motive gases it furnishes motive power for the compressor 17 and accessories such as servo mechanisms for controlling various functions of the engine, oil pumps for providing lubrication of the engine, etc. (not shown).

The fuel tank 13 is provided with a pump 21, usually of the electrically operated radial flow type, communicating with a supply conduit 22 for feeding fuel to the fuel system 12. The fuel system, in turn, is provided with a fuel delivery conduit 23 connected to the turbojet combustion apparatus 18, so that fuel is delivered thereto, as required, by the fuel system 12 which will now be described in detail.

The fuel pumping system 12 is provided with a pair of main fuel pumps 24 and 25 of the positive displacement type, and, as shown, are of the well known gear type. The main pumps 24 and 25 are connected to a pair of conduits 24a and 25a which communicate with each other at a common inlet passage 26 and a common outlet passage 27. The inlet passage 26 is in communication with the supply conduit 22 and the outlet passage 27 is in communication with the delivery conduit 23, so that the main pumps 24 and 25 may be termed "connected in parallel." That is, each of the pumps 24 and 25 is adapted to pump fuel to the delivery conduit 23 independently of the other through one of the separate parallel conduits 24a and 25a. With this arrangement, should one pump fail the other pump will provide the engine with fuel.

In addition to the above, a recirculation passage comprising conduits 28, 29 and 30 is provided for effecting recirculation of excess fuel pumped by main pumps 24 and 25. The conduits 28 and 29 communicate with the outlet or downstream end of the pumps 24 and 25, respectively, and are in communication with the conduit 30 which in turn communicates with the common inlet portion 26.

The flow of excess fuel through the conduits 28 and 29 is controlled by a dual hydraulic servo mechanism generally indicated 32. The servo mechanism 32 has one portion for controlling flow of excess fuel through conduit 28 and comprises a piston valve 33 having a piston portion 34 slidably disposed within a cylinder 35 and operable to open and close a port 36 by means of a valve 37 cooperable therewith. A spring 38 serves to bias the valve 37 in closing direction. The servo mechanism 32 further has a portion comprising a piston valve 40 for controlling flow of excess fuel through the conduit 29. Since the piston valve 40 may be identical to the piston valve 33, it need not be further described. The only distinction, if any, between the piston valves 33 and 40 is that the piston valve 40 may be provided with a biasing spring 38a of different characteristics than spring 38, so that the piston valve 40 moves to an open position in response to a lower fluid pressure than necessary to operate valve 33.

The fuel pumping system 12 may be further provided with a pair of spring biased check valves 42 and 43 disposed in the parallel conduits 24a and 25a to prevent recirculation from one pump through the by-pass circuit of the other pump. The cylinders 35 of the hydraulic servo mechanism 32 are connected by parallel passages 44a and 44b to a control conduit 44 which, in turn, is connected to an engine fuel control (not shown). Such fuel controls are well known in the art and are responsive to power lever position, and engine and flight conditions in a manner to insure that the fuel delivered to the engine through the delivery conduit 23 is adequate for proper engine performance at any selected position of the lever.

The main fuel pumps 24 and 25 may be connected to the engine shaft 20 by a power take-off arrangement 46 ilustrated, by way of example, as comprising a reduction gear box 46a connected to the turbine shaft 20 by a pair of crown gears 46b and 46c.

As thus far described, the fuel system is somewhat conventional and operates in the following manner. The tank fuel pump 21 is energized and provides a pressure head to the fuel flowing through the supply line 22, the inlet passage 26 and conduits 24a and 25a to the main pumps 24 and 25. The main fuel pumps 24 and 25 pump fuel past the check valves 42 and 43 through the outlet 27 and the delivery conduit 23 into the combustion apparatus 18 of the turbojet engine. Since more fuel then is required by the engine is normally pumped by the main pumps 24 and 25, the fluid pressure in the control conduit 44 is sufficiently high to open the piston valve 40 of the servo mechanism 32, so that fuel pumped by the main pump 25 is recirculated through the recirculation passages 29 and 30 back to the inlet and through the main pump 25. In the event that the pressure in the control conduit is further increased, indicating that more excess fuel need be recirculated, the piston valve 33 of the servo mechanism 32 will then open in response to such higher pressure, so that some of the fuel pumped by the main pump 24 is recirculated back to its inlet through the recirculation passages 28 and 30. With this arrangement, the total volume of fuel pumped by the main pumps 24 and 25 is constantly in excess of the demands of the engine, so that excess fuel is constantly being circulated through the recirculation passageways described above.

In accordance with the invention, a jet pump 47 comprising a jet nozzle 48 disposed within the inlet passage 26 is provided. The jet pump 47 is connected to the outlet passage 27 disposed downstream of the fuel system by a fuel conduit 49 having a valve 50 disposed therein. The valve 50 is of the pressure responsive type movable from the closed position to the open position upon drop in pressure below a predetermined value, and is connected to the supply conduit 22 by a small tube 51. Thus, the valve 50 is responsive to pressure in the supply conduit 22. For efficient operation of the jet pump 47, the inlet passage 26 may be provided with a narrow throat portion 52 disposed immediately downstream of the jet nozzle 48 so that as fuel flows through the nozzle 48 and the throat 52, a venturi effect is attained, creating a suction upstream of the nozzle in the supply conduit 22 and an increase in pressure downstream of the throat 52.

The operation of the fuel system 12 as now fully described is as follows. During normal operation and with the tank pump 21 in steady operation, fuel is supplied to the engine through the delivery pipe 23 in the usual manner and any excess fuel is recirculated through the recirculation conduits 28, 29 and 30 back to the inlet of the main pumps. However, should the tank pump 21 for any reason fail, so that the flow of fuel to the engine is endangered because of loss of head pressure in the fuel at the inlets of the main pumps 24 and 25, the drop in head pressure of the supply conduit 22 is immediately sensed by the valve 50. As soon as the pressure drop falls below the preselected value, the valve 50 moves to the open position and the resulting additional demand upon the fuel pumping system 12 is reflected in the servo mechanism 32 in such a manner that the piston valves 33 and 40 are moved in closing direction to reduce the amount of excess fuel being circulated around the main pumps and supply a portion of the excess fuel to the jet pump 47 by means of the conduit 49. Upon initiation of operation of the jet pump 47, the flow through the nozzle 48 draws fuel from the tank past the now inactive tank pump 21 and through the supply conduit 22 to restore the lost head pressure, so that the main pumps 24 and 25 may operate in the normal and safe manner. Since the reduced pressure will persist in the supply conduit 22 as long as the tank pump 21 is inoperative, because of the venturi effect of the jet pump 48, the pressure-responsive valve 50 will remain in the open position until the tank pump 21 is restored to operative condition.

Figure 2:
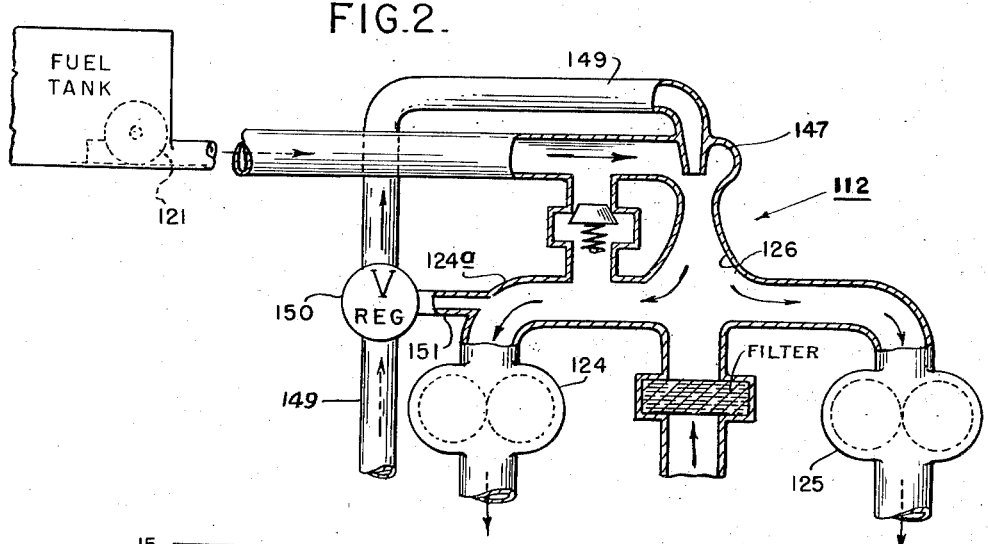
Fig. 2 is a fragmentary diagrammatic view illustrating another embodiment of the invention.

In Fig. 2 there is shown a fuel pumping system 112 illustrating a somewhat modified embodiment of the invention. Only that portion of the fuel pumping system 112 containing the modification is illustrated; however, it must be understood that those portions of the fuel system not illustrated may be identical to and operate in the same manner as the fuel pumping system 12.

In this embodiment, the jet pump 147 is provided with a fuel conduit 149 having a valve 150 disposed therein. The valve 150 is of the pressure-responsive type and is modulable between the closed and open positions in response to variations in liquid pressure. The valve 150 may be connected to the fluid conduit 124a by a small conduit 151 in such a manner that the valve is responsive to pressure variations of the fuel within the conduit 124a. With this arrangement, when the pressure in the conduit 124a is above a predetermined value the valve 150 is in the closed position preventing flow of fuel through the jet pump 147. However, when the pressure within the conduit 124a falls below a predetermined value as a result of failure of the tank pump 121, the valve 150 will move to an open position permitting fuel to flow through the conduit 149 to the jet pump 147. Upon initiation of operation of the jet pump, the head pressure in the inlet passage 126 and the conduit 124a will rise and the valve 150 will move toward the closed position thereby throttling the flow of fuel through the jet pump 147 until equilibrium is attained. That is, the valve 150 will stabilize itself in a position to provide sufficient flow to the jet pump 147 to insure provision of sufficient head pressure to the fuel flowing to the main pumps 124 and 125.

Figure 3:
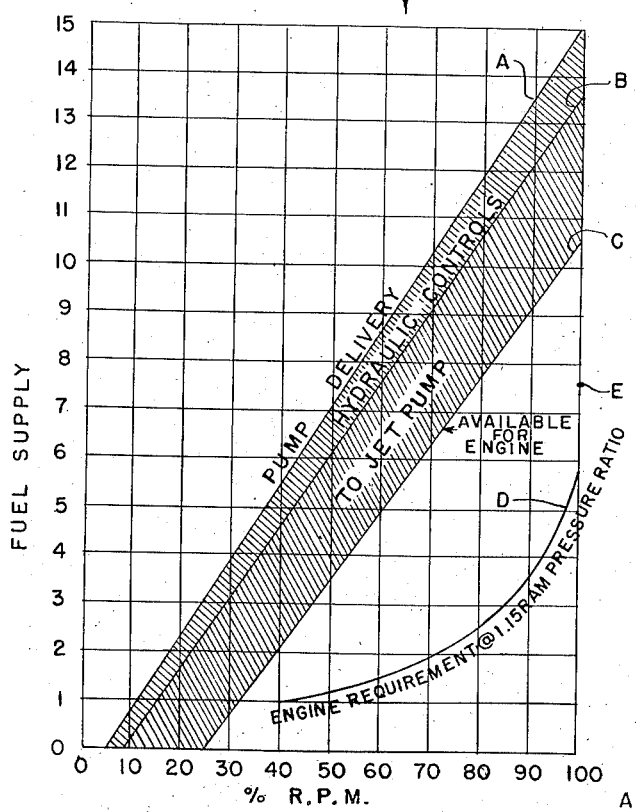
Fig. 3 is a chart illustrating typical fuel flow characteristics of the fuel pumping systems shown in Figs. 1 and 2.

Referring to Fig. 3 there is shown a chart illustrating typical fuel flow characteristics of the fuel pumping systems shown in Figs. 1 and 2. In this chart, the abscissa represents speed of the engine shaft 20 in percent maximum R. P. M. while the ordinate represents fuel flow in arbitrary units of volume. Curve A represents total pumping volume of fuel pumps 24 and 25 in the first embodiment and 124 and 125 in the second embodiment for various R. P. M. conditions of the engine. Curve B represents the amount of fuel available for the engine after allowing for diversion of fuel necessary for operation of the various hydraulic controls and servo mechanisms including the servo mechanism 32 usually provided for the turbojet engine 10. Curve C represents the amount of fuel available to the engine after allowing for recirculation of fuel through the jet pumps 47 of the first embodiment or 147 of the second embodiment. Curve D represents the amount of fuel necessary for the engine at 1.15 ram pressure ratio. It will be seen that the net amount of fuel available for the engine represented by curve C is considerably larger than that actually needed for the engine when the engine is operating at 1.15 ram pressure ratio. Although the engine operates at considerably higher values than the 1.15 ram pressure the maximum fuel required by the engine when operating within designed limits will never exceed the value indicated by point E at full or 100% R. P. M. of the engine shaft. Hence, the jet pump may be operated, when required, by fuel which otherwise is recirculated about the main pumps.

It will now be seen that the invention provides a simplified fuel pumping system for an aircraft engine in which the heretofore necessary booster pump is eliminated together with its attendant cost, weight and serious heating effect upon the fuel supplied to the engine. In addition to the above, a fuel pumping system is provided in which the tank pump is utilized to provide the necessary head pressure to the main pumps and a normally inactive pump, automatically actuated in response to reduction in head pressure of the fuel, is provided to insure that sufficient head pressure is provided to the fuel in the event of failure of the tank pump.

Furthermore, a simple and reliable fuel pumping system is provided in which the heretofore excess fuel is utilized to actuate a standby pump automatically operable in the event of failure of the tank pump to assume the function of the latter.

While the invention has been shown in several forms, it will be obvious to those skilled in the art that it is not so limited, but is susceptible of various other changes and modifications without departing from the spirit thereof

What is claimed is:

1. A fuel system for an aircraft engine including a tank, a fuel supply conduit from said tank, a first pump associated with said tank for providing a predetermined head pressure in said supply conduit, a plurality of positive displacement pumps disposed in parallel branch conduits having a common inlet adapted to be connected to said supply conduit and a common fuel delivery outlet adapted to be connected to the engine, a recirculation conduit communicating with said inlet and said outlet, valve means disposed in said recirculation conduit and responsive to an engine fuel demand signal to control recirculation of fuel pumped by said positive displacement pumps in excess of the quantity demanded by the engine, a secondary pump for augmenting said head pressure, said secondary pump being disposed in communication with said supply conduit and means including a member responsive to pressure of fuel in said supply conduit for controlling said secondary pump, said secondary pump being inactive at head pressures equal to or greater in value than said predetermined value and said means being operable in response to reduction in head pressure below said predetermined value to actuate said secondary pump.

2. A fuel system for an aircraft engine including a tank, a fuel supply conduit from said tank, a first pump associated with said tank for providing a predetermined head pressure in said supply conduit, a plurality of main pumps disposed in parallel branch conduits having a common inlet adapted to be connected to said supply conduit and a common fuel delivery outlet adapted to be connected to the engine, a recirculation conduit communicating with said inlet and said outlet, valve means disposed in said recirculation conduit and responsive to an engine fuel demand signal to control recirculation of fuel pumped by said main pumps in excess of the quantity demanded by the engine, a jet pump having a nozzle disposed in said common inlet, means providing a passage connecting said nozzle to said common outlet, and a pressure responsive valve for controlling flow of fuel from said common outlet to said nozzle, said pressure responsive valve being disposed in said passage means and being movable to an open position in response to a decrease in head pressure below said predetermined value, whereby said jet pump is rendered operative to maintain said predetermined head pressure value in the event of failure of said first pump.

3. The structure recited in claim 2 and further including second passage means providing a fluid communication between said supply conduit and said pressure responsive valve, and in which said pressure responsive valve is movable to a fully open position from a fully closed position, whereby said pressure responsive valve is responsive to pressure in said supply conduit between said first pump and said jet pump.

4. In a fuel system for an aircraft engine including a tank; a fuel supply conduit from said tank, a first pump associated with said tank for providing a predetermined head pressure in said supply conduit, an engine driven pump having a fuel supply inlet and a fuel delivery outlet, said engine driven pump being disposed downstream of said first pump and said supply inlet being in communication with said supply conduit, a recirculation conduit communicating with said supply inlet and said delivery outlet, valve means disposed in said recirculation conduit and responsive to an engine fuel demand signal to control recirculation of excess fuel pumped by said engine driven pump, a jet pump having a nozzle disposed in said supply inlet for maintaining said predetermined value of head pressure in the fuel supplied to said engine driven pump when said first pump is inactivated, said nozzle being in fluid communication with said delivery outlet, whereby said jet pump is adapted to be energized by excess fuel pumped by said engine driven pump, and means responsive to reduction in head pressure below said predetermined value for permitting excess fuel to flow through said nozzle.

5. A fuel system for an aircraft engine including a driven pump having a fuel supply inlet and a fuel delivery outlet, a recirculation conduit communicating with said supply inlet and said delivery outlet, valve means disposed in said recirculation conduit and responsive to an engine fuel demand signal to control recirculation of excess fuel pumped by said driven pump, a jet pump having a nozzle disposed in said supply inlet for maintaining a predetermined value of head pressure in the fuel supplied to said driven pump, passage means providing a fluid communication between said nozzle and said delivery outlet, whereby said jet pump is adapted to be energized by excess fuel pumped by said driven pump, a pressure responsive valve disposed in said passage means for controlling flow of fuel through said nozzle, said valve being movable to an open position in response to a decrease in head pressure below said predetermined value of head pressure.

6. A fuel system for an aircraft engine including a driven pump having a fuel supply inlet and a fuel delivery outlet, a recirculation conduit communicating with said supply inlet and said delivery outlet, valve means disposed in said recirculation conduit and responsive to an engine fuel demand signal to control recirculation of excess fuel pumped by said driven pump, and a jet pump having a nozzle disposed in said supply inlet for maintaining a predetermined value of head pressure in the fuel supplied to said driven pump, first passage means providing a fluid communication between said nozzle and said delivery outlet, whereby said jet pump is adapted to be energized by excess fuel pump by said driven pump, a modulating pressure responsive valve disposed in said passage means for controlling flow of fuel through said nozzle, second passage means providing a fluid communication between said pressure responsive valve and said supply inlet, whereby said valve is responsive to pressure of fuel between said driven pump and said jet pump, said pressure responsive valve being movable in opening direction in response to a decrease in pressure below said predetermined pressure.

References Cited in the file of this patent
UNITED STATES PATENTS
2,435,982   Samiran et al.           Feb. 17, 1948